United States Patent

[11] 3,596,471

[72] Inventor Martin Streich
  Nieder-Eschbach, Germany
[21] Appl. No. 806,415
[22] Filed Mar. 12, 1969
[45] Patented Aug. 3, 1971
[73] Assignee Messer Griesheim G.m.b.H.
  Frankfurt, Germany
[32] Priority Mar. 15, 1968
[33] Germany
[31] P 16 67 639.4

[54] PROCESS FOR RECOVERING A MIXTURE OF KRYPTON AND XENON FROM AIR WITH ARGON STRIPPER
10 Claims, 3 Drawing Figs.

[52] U.S. Cl. ................................................ 62/22,
  62/20, 62/29, 23/2.1
[51] Int. Cl. ............................................ F25j 3/02,
  F25j 3/08
[50] Field of Search ................................... 62/20, 22,
  27, 28, 29; 23/2.1

[56] References Cited
UNITED STATES PATENTS
2,051,576  8/1936  Schlitt ........................ 62/22
2,962,868  12/1960  Dennis ....................... 62/22
FOREIGN PATENTS
1,158,534  12/1963  Germany ..................... 62/22

Primary Examiner—Norman Yudkoff
Assistant Examiner—Arthur F. Purcell
Attorney—Paul W. Garbo ABSTRACT: Oxygen-rich liquid from the bottom of the low-pressure column of a two-column air separation plant is partially vaporized, hydrocarbons are removed from the residual liquid, and the liquid is then stripped of oxygen by contact with gaseous argon. The stripped liquid is vaporized, the vapor is compressed, residual hydrocarbons in the vapor are burned, and the combustion products are removed from the vapor. Thereafter, the vapor is expanded into a rectifying column from the bottom of which a mixture of krypton and xenon is recovered. Desirably, the gaseous effluent from this rectifying column is further expanded into another rectifying column from the bottom of which argon is recovered.

PROCESS FOR RECOVERING A MIXTURE OF KRYPTON AND XENON FROM AIR WITH ARGON STRIPPER

BACKGROUND OF THE INVENTION

This invention relates to a process for the recovery of a mixture of krypton and xenon from air, using the oxygen-rich liquid of a conventional air separation plant as the starting material. Preferably, the process uses the liquid oxygen accumulating in the bottom of the low-pressure column of any known two-column air separation plant.

The oxygen-rich liquid contains the inert gases krypton and xenon in small concentrations, and the normal procedure for concentrating these inert gases consists of a multiple step partial vaporization of the liquid. During this process, the krypton and xenon mixture becomes successively more concentrated in the liquid portion. Simultaneously, hydrocarbons, that entered the air separation plant with the feed air and remained in the oxygen-rich liquid, become more concentrated, unless they were previously removed by adsorption. Complete removal of hydrocarbons by adsorption is not practical.

Complete vaporization of the oxygen-rich liquid is not advisable, since one must always take into account the fact that the liquid oxygen contains hydrocarbons which were not adsorbed and will be concentrated beyond the ignition limit or solubility limit during the vaporization process.

There are two ways to eliminate these difficulties. Either, one tries to reduce the hydrocarbon concentration or, one replaces the oxygen by another gas.

The first possibility is used in West German Pat. Nos. 1,099,564 and 1,122,561. The processes of these patents allow very extensive vaporization of the liquid oxygen due to dilution of the hydrocarbons by adsorption. However, complete removal of the hydrocarbons is not possible. Particularly, methane and ethane cannot be entirely eliminated by this method.

The second possibility is illustrated by East German Pat. No. 39,707. In this case, the oxygen in the liquid, which is combustible with hydrocarbons, is stripped with freon gas. For this process, a gas is required that is not contained in air. In another process, the oxygen in the liquid is stripped with gaseous nitrogen. However, due to the equilibrium conditions, the replacement of oxygen by nitrogen remains incomplete, and the result is poor rectification in the stripping column.

A principal object of this invention is to provide a process for the recovery of a mixture of krypton and xenon from air wherein no additional foreign stripping gas is required and the resulting rectification in the stripping column is good.

SUMMARY OF THE INVENTION

In accordance with this invention, oxygen-rich liquid containing small concentrations of krypton, xenon and hydrocarbons is withdrawn from an air separation plant, hydrocarbons therein are partially eliminated by adsorption, oxygen is partially removed from the liquid by stepwise vaporization of the liquid to an extent that is practical in view of the explosion hazard due to residual hydrocarbons in the liquid, and the bulk of the remaining oxygen in the liquid is stripped therefrom by contact with gaseous argon. Thereafter, the liquid is vaporized, compressed, treated to eliminate residual hydrocarbons, and finally expanded into a rectification zone from the bottom of which a mixture of krypton and xenon is recovered.

It is particularly advantageous to use as starting material oxygen-rich liquid withdrawn from the low-pressure column of the well-known double-column air separation plant. Moreover, it is advantageous to withdraw from this low-pressure column also the stream to supply the argon required for the process. For this purpose, the low-pressure column is provided with an auxiliary argon column from the top of which crude argon is withdrawn.

The principal advantage of the process of this invention is that good rectification is achieved by stripping oxygen from the liquid by contact with gaseous argon. Another advantage is the fact that the process can be easily integrated into an air separation plant which is required to produce pure argon as well.

For a fuller understanding of the invention, three illustrative embodiments will now be described in detail in connection with the accompanying drawings.

BRIEF DESCRIPTION OF THE DRAWINGS

The three drawings use identical numbers to identify identical equipment components.

DESCRIPTION OF PREFERRED EMBODIMENTS

Figure 1:
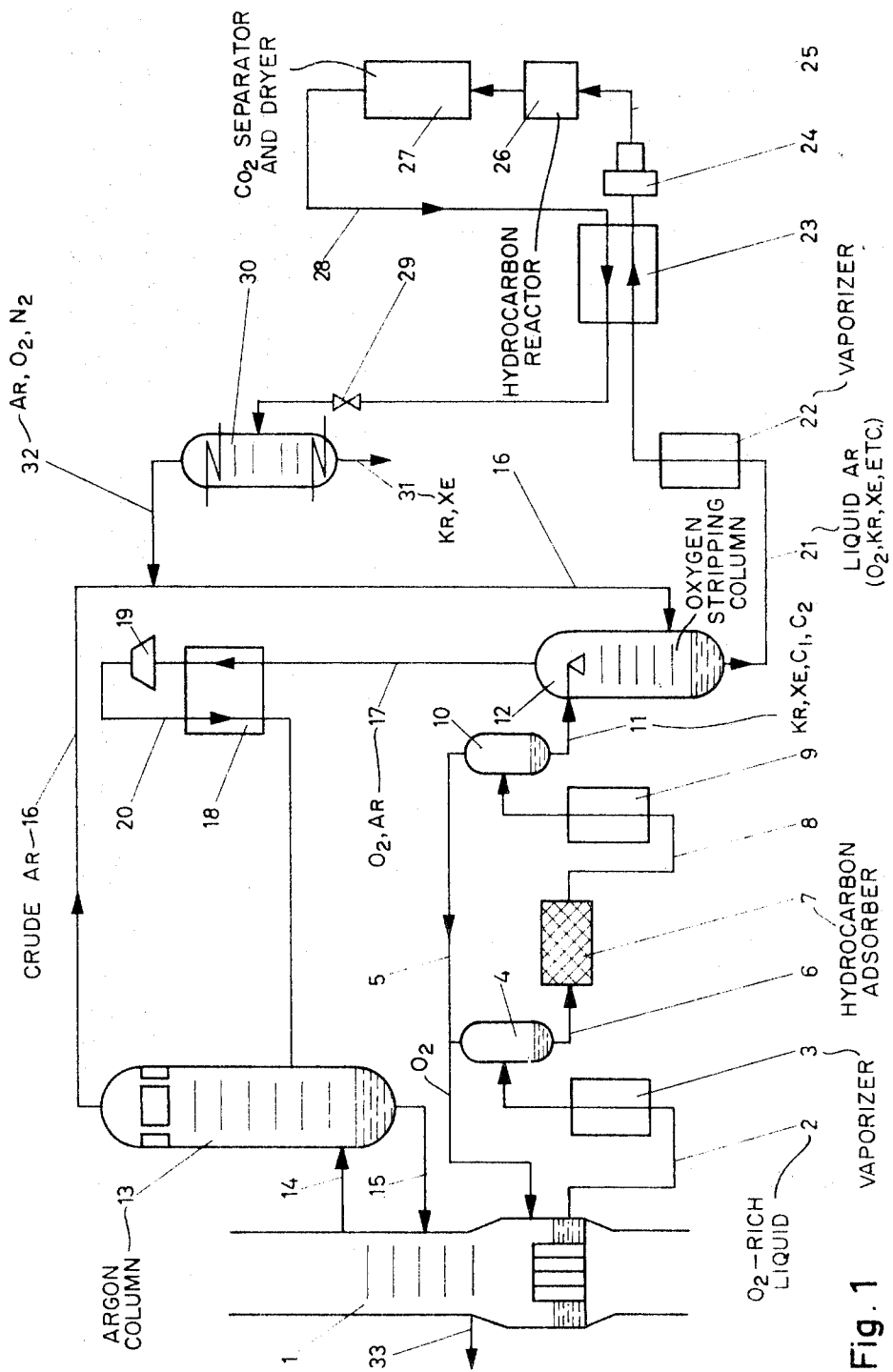
FIG. 1 is a flowsheet of one form of the process of the invention without argon recovery.

In FIG. 1, the bottom of low-pressure column 1 of a double-column plant for air separation supplies oxygen-rich liquid containing small concentrations of krypton, xenon and hydrocarbons through line 2. This liquid is partially vaporized in vaporizer 3 and separated in separator 4 into a liquid and gaseous phase. The gaseous phase is nearly pure oxygen and is returned to low-pressure column 1 through line 5. The liquid phase flows through line 6 into absorber 7 where a large portion of the hydrocarbons is absorbed. Line 8 conveys the liquid mixture through a second vaporizer 9 for further partial vaporization and into a second separator 10 where there is again a separation of a liquid and a gaseous phase. The gaseous phase, nearly pure oxygen, returns (as in the case of separator 4) to low-pressure column 1 through line 5. The liquid phase, which now contains increased concentrations of krypton, xenon and residual (not absorbed) hydrocarbons, mainly methane and ethane, is fed by line 11 into the top of oxygen stripping column 12.

The argon required for the process is recovered in auxiliary argon column 13 which is continuously supplied with gaseous oxygen containing argon and nitrogen by line 14 from low-pressue column 1. A liquid of nearly identical composition returns to low-pressure column 1 through line 15. In the top of argon column 13, there is a condenser which is cooled in a known way, such as with crude oxygen. Consequently, rectification takes place in argon column 13. Crude gaseous argon containing approximately 3 percent oxygen and 1 percent nitrogen is withdrawn from its top through line 16 and discharged into the bottom of stripping column 12. The gaseous argon strips oxygen from the liquid supplied by line 11. A gaseous mixture of oxygen and argon is withdrawn from the top of stripping column 12 through line 17 and heated against itself in heat exchanger 18. The heated stream is returned to argon column 13 by means of blower 19 and line 20 after being cooled in heat exchanger 18.

A liquid consisting mainly for argon is withdrawn from the bottom of stripping column 12. This liquid, containing approximately 4 percent oxygen as well as krypton, xenon, hydrocarbons and nitrogen, passes through line 21 into vaporizer 22 where it is vaporized completely. The vapor is further heated against itself in heat exchanger 23, compressed in compressor 24, and fed by line 25 into hydrocarbons reactor 26. Here, the catalytic combustion of residual hydrocarbons takes place, producing carbon dioxide and water. The two combustion products are removed in carbon dioxide separator and dryer 27. Now, the gas mixture consists of argon, oxygen, nitrogen, krypton nd xenon, and flows through line 28 and heat exchanger 23 wherein it is cooled against itself. The cooled gas mixture is expanded through expansion valve 29 into fractionating column 30. The desired mixture of krypton and xenon is withdrawn from the bottom of column 30 by line 31.

A gaseous mixture of argon, oxygen and nitrogen issues from the top of fractionating column 30 through line 32 and is added to the crude gaseous argon in line 16. Of course, the mixture of krypton and xenon can be separated into its components in an additional rectification stage. Oxygen produced in low-pressure column 1 is withdrawn through line 33 in the usual manner.

Figure 2:
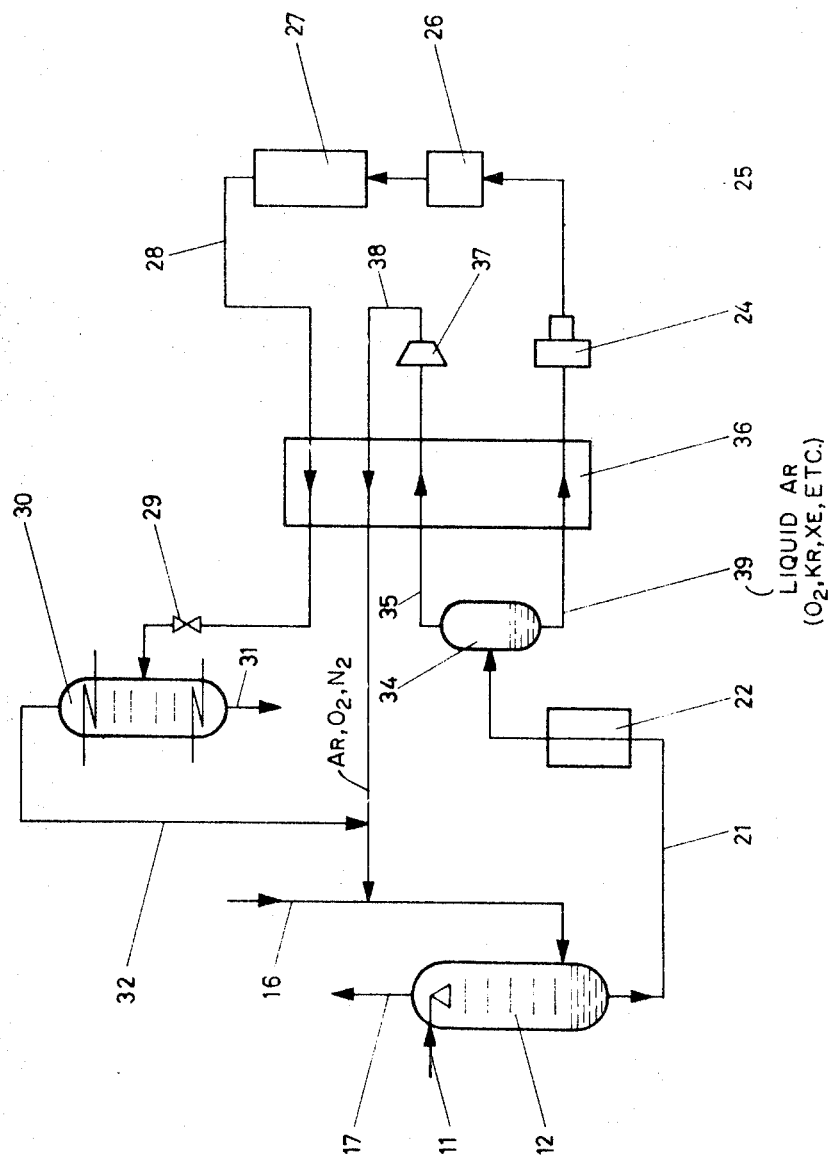
FIG. 2 is a partial flowsheet showing a modification of the process of FIG. 1.

FIG. 2 shows a modified process. Up to entry into argon stripping column 12, this process is identical to that of FIG. 1. The gaseous argon and oxygen mixture, withdrawn by line 17 from the top of stripping column 12, is also processed as already described. The liquid mixture of argon, oxygen, krypton, xenon, hydrocarbons and nitrogen, withdrawn from the bottom of stripping column 12 by line 21, is also fed into vaporizer 22, where, however, contrary to the process of FIG. 1, it is only partially vaporized. The partially vaporized mixture flows into separator 34 where it is separated into a liquid and a gaseous phase. The gaseous phase consisting of argon, oxygen and nitrogen passes through line 35 into heat exchanger 36 where it is heated. Thence, it continues through blower 37 and line 38 back into heat exchanger 36 for cooling, and is then added to the crude gaseous argon flowing through line 16 into stripping column 12.

The liquid phase consisting of argon, oxygen, krypton, xenon, hydrocarbons and nitrogen flows through line 39 into heat exchanger 36 where it is completely vaporized. From here on, the process corresponds to that described in connection with FIG. 1. The vaporized mixture is compressed in compressor 24 and passed through line 25, hydrocarbon reactor 26, carbon dioxide separator and dryer 27, line 28, heat exchanger 36, nd expansion valve 29 into fractionating column 30. The desired mixture of krypton and xenon is withdrawn from the bottom of column 30 through line 31. A mixture of argon, oxygen and nitrogen issues from the top of fractionating column 30 nd is added by line 32 to the gaseous phase withdrawn from separator 34 and discharged by line 38 into line 16.

Figure 3:
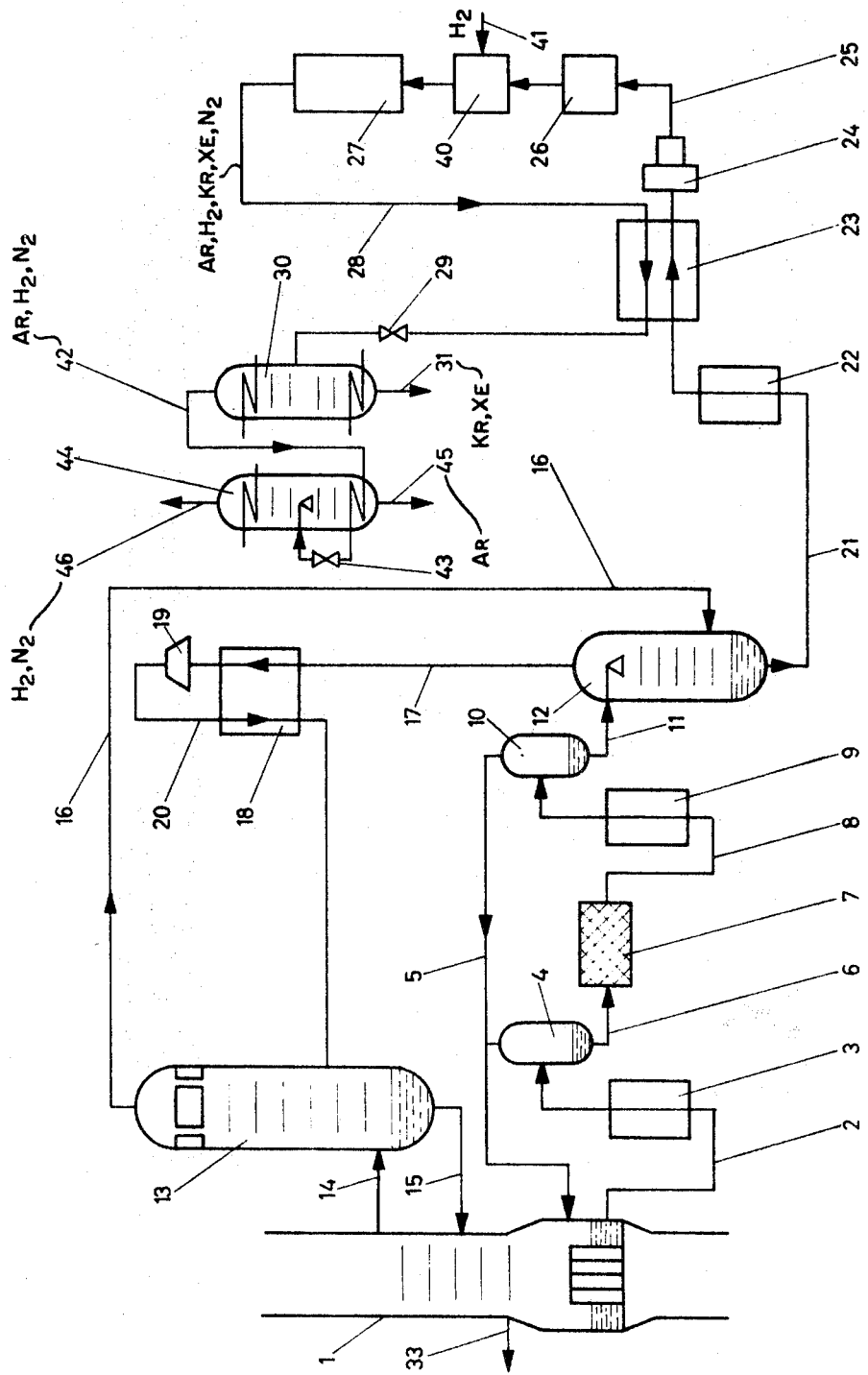
FIG. 3 is a flowsheet showing another modification of the process of FIG. 1 with argon recovery.

In the process shown in FIG. 3, pure argon is recovered besides the mixture of krypton and xenon. To begin with, the process corresponds exactly to that shown in FIG. 1. The differences start downstream of hydrocarbon reactor 26. The gaseous mixture does not pass directly into carbon dioxide separator and dryer 27, but first into Deoxo unit 40, where the oxygen in the mixture is burned with hydrogen supplied through line 1. Then, carbon dioxide and water are removed in carbon dioxide separator and dryer 27 so that the gas mixture in line 28 consists of argon, hydrogen, krypton, xenon and nitrogen. This mixture is cooled in heat exchanger 23 and is then expanded through expansion valve 29 into fractionating column 30. The desired mixture of krypton and xenon is withdrawn through line 31 at the bottom of column 30. A gaseous mixture of argon, hydrogen and nitrogen flows from the top of column 30 through line 42 and a heating coil in the bottom of fractionating column 44 and is then expanded through expansion valve 43 into column 44. At the bottom of fractionating column 44, the desired argon is withdrawn through line 45. Gaseous nitrogen and hydrocarbon issue from the top of column 44 through line 46.

The process of FIG. 3 shows very impressively how easy it is to integrate the process of this invention into a process which is to produce pure argon as well.

I claim:

1. In the process of separating oxygen and nitrogen by the liquefaction and rectification of air, he improvement of recovering a mixture of krypton and xenon which comprises partially vaporizing oxygen-rich liquid containing small concentrations of krypton, xenon and hydrocarbons to increase said small concentrations, absorbing hydrocarbons from the remaining liquid, partially vaporizing said remaining liquid, stripping oxygen from the residue of the partially vaporized remaining liquid by contact with an argon-rich gaseous stream, vaporizing the stripped liquid, warming and compressing the resulting vapor, effecting combustion of residual hydrocarbons in the compressed vapor and removal of carbon dioxide and water from said compressed vapor, and thereafter cooling and expanding said compressed vapor into a rectification zone from he bottom of which said mixture of krypton and xenon is recovered.

2. The process of claim 1 wherein said rectification of air is effected in stages in a high-pressure rectification zone and a low-pressure rectification zone, said oxygen-rich liquid is drawn from said low-pressure zone, oxygen vapor containing argon is passed from said low-pressure zone to an auxiliary rectification zone, and said argon-rich gaseous stream is drawn from the top of said auxiliary zone for contact with said residue of the partially vaporized remaining liquid.

3. The process of claim 2 wherein said argon-rich gaseous stream after contacting said residue of the partially vaporized remaining liquid is returned to said auxiliary zone to separate stripped oxygen therefrom.

4. The process of claim 1 wherein said stripped liquid is first partially vaporized, and the resulting vapor is added to said argon-rich gaseous stream.

5. The process of claim 1 wherein the gaseous effluent from the top of said rectification zone from which said mixture of krypton and xenon is recovered is added to said argon-rich gaseous stream.

6. The process of claim 1 wherein the gaseous effluent from the top of said rectification zone from which said mixture of krypton and xenon is recovered is expanded into a second rectification zone from the bottom of which liquid argon is recovered.

7. The process of claim 1 wherein said compressed vapor, after effecting combustion of said residual hydrocarbons therein, is reacted with hydrogen to convert oxygen herein to water.

8. In the process for separating oxygen and nitrogen by the liquefaction and rectification of air in stages in a high-pressure rectification zone and a low-pressure rectification zone, the improvement of recovering a mixture of krypton and xenon which comprises withdrawing oxygen-rich liquid from the bottom of said low-pressure zone, effecting multiple step partial vaporization of said liquid to decrease its oxygen content and thereby increase its small contents of krypton, xenon and hydrocarbons, absorbing hydrocarbons from the remaining liquid, passing oxygen vapor containing argon from said low-pressure zone to an auxiliary rectification zone, drawing an argon-rich gaseous stream from the top of said auxiliary zone, stripping oxygen from said remaining liquid by contact with said argon-rich stream, returning said argon-rich stream after contact with said remaining liquid to said auxiliary rectification zone, and recovering said mixture of krypton and xenon from the stripped liquid.

9. The process of claim 8 wherein said stripped liquid is first partially vaporized, the resulting vapor is added to said argon-rich stream, the remaining stripped liquid is fractionated to yield said mixture of krypton and xenon as a liquid fraction and a gaseous fraction, and said gaseous fraction is added to said argon-rich stream.

10. The process of claim 8 wherein said stripped liquid is vaporized, the resulting vapor is treated to eliminate residual hydrocarbons and oxygen therefrom by combustion, the products of combustion are removed from said vapor, thereafter said vapor is fractionated to yield said mixture of krypton and xenon as a liquid fraction and a gaseous fraction, and said gaseous fraction is further fractionated to yield argon as a liquid fraction.